United States Patent [19]
Bergmann

[11] Patent Number: 6,091,543
[45] Date of Patent: Jul. 18, 2000

[54] APPARATUS FOR PROVIDING NON-RECIPROCAL TERMINATION OF PARALLEL LIKE POLARIZATION MODES

[75] Inventor: Ernest Eisenhardt Bergmann, Fountain Hill, Pa.

[73] Assignee: Lucent Technologies Inc., Murray Hill, N.J.

[21] Appl. No.: 08/819,478

[22] Filed: Mar. 17, 1997

[51] Int. Cl.$^7$ .................................................. G02B 5/30
[52] U.S. Cl. ......................... 359/495; 359/484; 359/497
[58] Field of Search ................................... 359/280, 484, 359/494, 495, 497

[56] References Cited

U.S. PATENT DOCUMENTS

| | | | |
|---|---|---|---|
| 5,204,771 | 4/1993 | Koga | 359/281 |
| 5,608,570 | 3/1997 | Brandle, Jr. et al. | 359/321 |

OTHER PUBLICATIONS

M. Koga, "Compact quartzless optical quasi–circulator", *Electronic Letters*, Aug. 18, 1994, pp. 1438–1440.

*Primary Examiner*—Darren E. Schuberg
*Attorney, Agent, or Firm*—Gibbons, Del Deo, Dolan, Griffinger & Vecchione

[57] ABSTRACT

The present invention teaches a methodology for producing parallel beams having like polarizations or parallel like polarization modes (PLPM) without utilizing 90 degree polarization interchangers, e.g., half wave plates. By utilizing Faraday rotators in combination with one or more walk off devices, non-reciprocal termination of PLPM can be achieved without half wave plates. According to one advantageous embodiment of the invention an optical apparatus of the present invention comprises a first walk-off device having a first optical port at a first end thereof and a second and third optical port at a second end thereof. A first Faraday rotator is coupled in an optical path with the second optical port of the first walk off device and a second Faraday rotator is coupled in an optical path with the third optical port of the first walk off device, where each of the Faraday rotators are made from the same material and provides a polarization rotation opposite to each other which is a multiple of 45 degrees. In an alternate embodiment of the present invention a second walk off device is disposed between the first walk off device and the first and second Faraday rotators, where the second walk off device includes first and second optical ports at a first end thereof aligning with the second and third optical ports of the first walk off device and third and fourth optical ports at a second end thereof aligning with the first and second Faraday rotator, respectively. The first and second walk off device produce beam polarizations which are substantially at a 45 degree angle with respect to the parallel beam separation at the second end of the second walk off device.

4 Claims, 3 Drawing Sheets

← LEFT-TO-RIGHT

← RIGHT-TO-LEFT

APPARATUS FOR PROVIDING NON-RECIPROCAL TERMINATION OF PARALLEL LIKE POLARIZATION MODES

RELATED APPLICATIONS

The present patent application is related to U.S. patent application, Ser. No. 08/578,721 now U.S. Pat. No. 5,729,377, entitled OPTICAL APPARATUS (Bergmann-24), filed Dec. 26, 1995, that application having a common inventor and being incorporated herein by reference.

TECHNICAL FIELD

This invention relates generally to the field of optical devices and more particularly to optical devices, such as circulators, isolators and switches, that are used in optical communications systems.

BACKGROUND OF THE INVENTION

Optical communications systems, as well as other optical technologies, require apparatus that manipulates optical signals that are in the form of light rays. One of the best known apparatus for such manipulation is the silica based optical fiber which is widely used for both short and long distance optical transmission. Additionally, other well known apparatus include couplers and multiplexers that have been developed to couple one or more optical signals into one or more optical fibers or waveguides. Some applications for transmission of optical signals also desirably use non-reciprocal apparatus or devices, where the propagation characteristics of light within the apparatus depends upon the direction of light propagation within the apparatus.

One type of such non-reciprocal apparatus, commonly referred to as an optical isolator, permits light to pass through the apparatus in one direction but not in the reverse direction. Another type of such non-reciprocal apparatus is termed an optical circulator. An optical circulator has 3 or more ports which permit light to pass from a first to a second port, for example, but not from the second port to the first port; instead light entering the second port passes to a third port. An isolator may be thought of as a two port circulator. However, the term isolator is the preferred term.

Many types of optical devices, including circulators and isolators, have been developed for commercial applications. For many applications, such a device should be polarization independent to the external world; that is, device operation should not depend upon the polarization of the incoming light. For example, Fujii in Journal of Lightwave Technology, Vol. 10, pp. 1226–1229, September 1992, describes a polarization independent apparatus that as stated can be used as an optical circulator. Although stated to be useful over a wide range of wavelengths, preferred operation of the apparatus depends upon precise orientation of the components with respect to each other. Another optical circulator is described in U.S. Pat. No. 5,204,771 issued to Koga on Apr. 20, 1993. The essence of the Koga circulator appears to be the use of a birefringent plate followed by non-reciprocal optical rotators. The birefringent plate splits the incoming beam into two parallel beams, and the optical rotators change the polarizations of each of the two beams by 45 degrees so that there are two parallel beams with orthogonal polarizations.

Consideration of the devices described in the previous paragraph reveals aspects that make their use disadvantageous in some situations. As mentioned, the Fujii circulator depends upon precise relative orientation of the components. This orientation may be difficult to achieve in practice and still more difficult to maintain for extended periods of time. The Koga device is extremely complicated. The complexity arises not only because there are many components, where the individual components are made up of multiple connected plates, but also because the large number of components necessarily has a large number of surfaces. Any one of these surfaces can produce undesired reflections. The devices must be designed to either eliminate the reflections or to compensate for them. Additionally, the optical rotators must be precisely aligned so that one beam passes through the top half of the rotator and the other beam passes through the bottom half of the rotator. The small beam sizes and small separation of the beams will likely make this difficult. Accordingly, there is a need for an optical circulator device which is simpler to manufacture and maintain than those devices found in the prior art.

SUMMARY OF THE INVENTION

The present invention teaches a methodology for producing parallel beams having like polarizations or parallel like polarization modes (PLPM) without utilizing 90 degree polarization interchangers, e.g., half wave plates. By utilizing Faraday rotators in combination with one or more walk off devices, non-reciprocal termination of PLPM can be achieved without half wave plates. According to one advantageous embodiment of the invention an optical apparatus of the present invention comprises a first walk-off device having a first optical port at a first end thereof and a second and third optical port at a second end thereof. A first Faraday rotator is coupled in an optical path with the second optical port of the first walk off device and a second Faraday rotator is coupled in an optical path with the third optical port of the first walk off device, where each of the Faraday rotators are made from the same material and provides a polarization rotation opposite to each other which is a multiple of 45 degrees.

In an alternate embodiment of the present invention a second walk off device is disposed between the first walk off device and the first and second Faraday rotators, where the second walk off device includes first and second optical ports at a first end thereof aligning with the second and third optical ports of the first walk off device and third and fourth optical ports at a second end thereof aligning with the first and second Faraday rotator, respectively. The first and second walk off device produce beam polarizations which are substantially at a 45 degree angle with respect to the parallel beam separation at the second end of the second walk off device.

BRIEF DESCRIPTION OF THE DRAWINGS

A more complete understanding of the present invention may be obtained from consideration of the following description in conjunction with the drawings in which.

DETAILED DESCRIPTION

Figure 1:
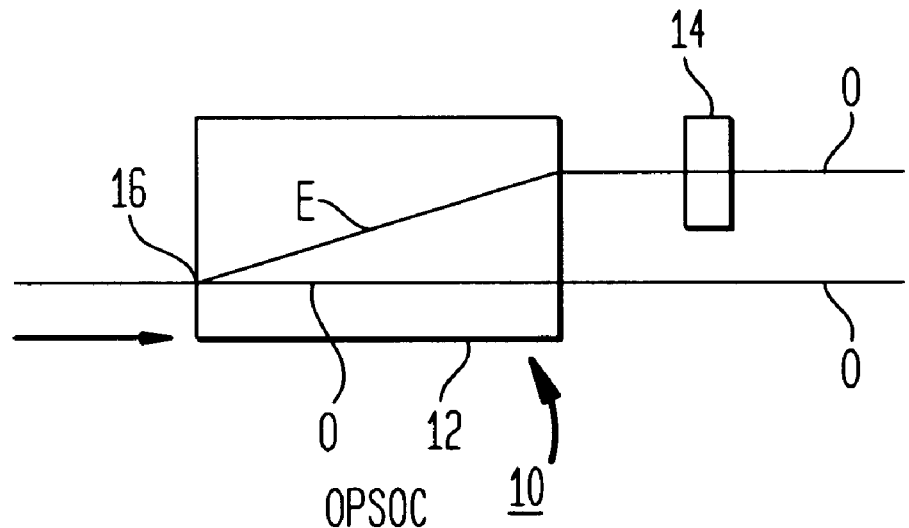
FIG. 1 is a sectional view of an O polarization splitter or combiner (OPSOC) optical device used in conjunction with the present invention.

Referring to FIG. 1, there is shown one exemplary embodiment of an optical device 10 termed an Ordinary Polarization Splitter Or Combiner (OPSOC). As shown in FIG. 1, the OPSOC 10 is comprised of a walk-off device 12 and polarization interchanger 14, for example, a half wave plate whose fast axis is oriented 45 degrees relative to the incident polarization direction, or other 90 degree rotator which interchanges the polarization of a beam applied thereto by 90 degrees. As used in the instant application, the term interchanger is intended to cover a wide variety of devices which transform polarization from one state to another. The direction of propagation of an incoming light beam is designated by the arrow. As shown, the walk-off device splits the incoming light beam into "ordinary" and "extraordinary" polarized beams which are designated as O and E, respectively, The incoming beam enters the walk-off device 12 of the OPSOC 10 at port 16 which is adapted to receive the incoming light and functions as an input. The E-polarized beam passes through the polarization interchanger 14, where the polarization, as explained, is interchanged by 90 degrees. The E-polarized component is changed into O-polarized at the outputs and there are two parallel O-polarized beams with respect to the walk-off device 12. That is, the two beams exiting from the device are parallel and have parallel polarizations after polarization interchanging. The walk-off device 12 may be fabricated from a birefringent material such as calcite or rutile, such materials are well known and the walk-off device will be readily fabricated by those skilled in the art as will the polarization interchanger 14. As would be understood, the main requirement for the walk-off device is to separate incoming polarizations of the input beam into parallel outgoing beams of orthogonal polarization.

Although the beam is shown as going from left to right with the device operating as a polarization splitter, the device may also be operated as a polarization combiner with the two O-polarized beams (with respect to walk-off device 12) going from right to left and entering the device on the right side. The polarization interchanger 14 is now used so that the O-polarized component is changed into E-polarized when combining. When combining, the walk-off device 12 then walks the E and O-polarized beams together so that both beams combine and exit at port 16 which now functions as an output.

Figure 2:
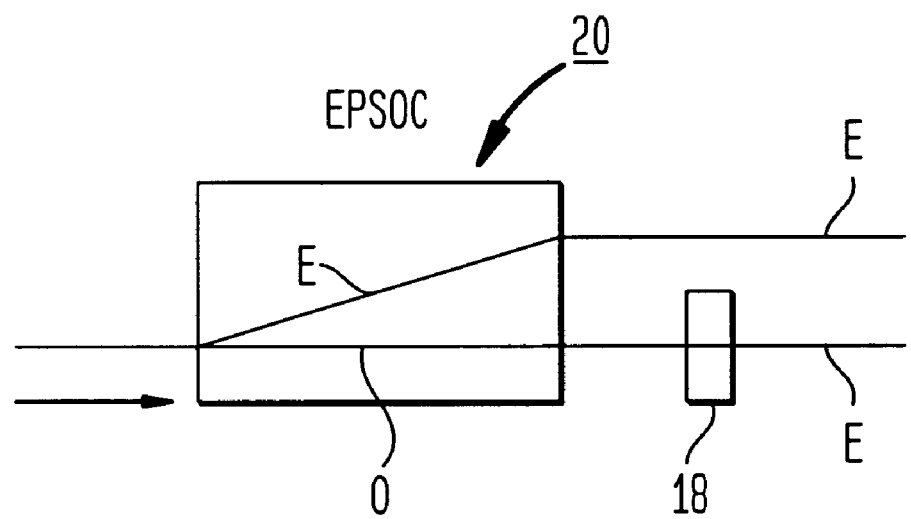
FIG. 2 is a sectional view of an E polarization splitter or combiner (EPSOC) optical device used in conjunction with the present invention.

The polarization interchanger may also interchange the polarization of the O-polarized beam exiting from the first walk-off device; such a device 20 is depicted in FIG. 2. The device is similar to that depicted in FIG. 1 except that the two outgoing beams are E-beams because the O-polarized beam passes through polarization interchanger 18. Accordingly, the device 20 is conveniently referred to as an Extraordinary Polarization Splitter Or Combiner or EPSOC. The EPSOC device 20 is generally similar to the OPSOC device; however, the polarization interchanger 18 is used to change the O-polarized component into E-polarized when splitting and to change the E-polarized component into O-polarized when combining.

As stated, the OPSOC and EPSOC devices 10, 20 of FIGS. 1 and 2, respectively, each operate such that a single unpolarized beam entering a device, produces two beams exiting from the device that are parallel and have parallel polarizations. These devices are also reciprocal in that they can be used to combine two parallel beams having like polarizations into a single beam. The present invention teaches an alternate methodology for producing parallel beams having like polarizations or parallel like polarization modes (PLPM) without utilizing 90 degree polarization interchangers, e.g., half wave plates. As will be explained, by utilizing Faraday rotators in combination with a walk off device, non-reciprocal termination of PLPM can be achieved without half wave plates.

Figure 3:
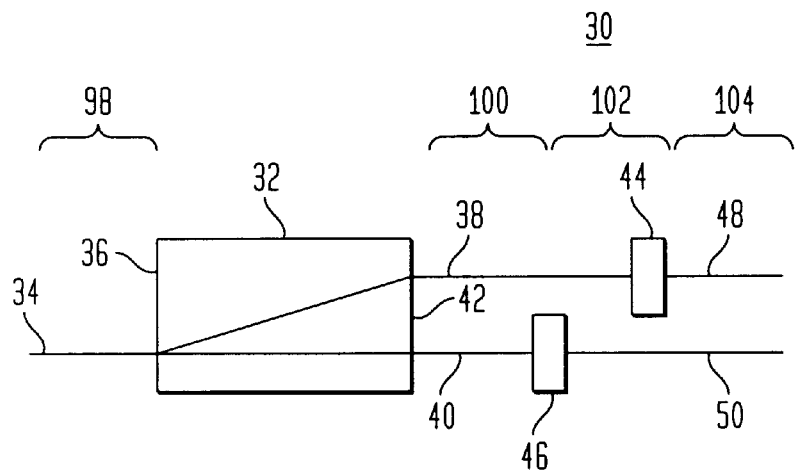
FIG. 3 shows a sectional view for one embodiment of a scheme for non-reciprocal termination of parallel like polarization modes in accordance with the present invention.

Referring to FIG. 3 there is shown one embodiment of a non-reciprocal optical device 30 in accordance with the present invention. As shown, the device includes a walk off device 32 having a first optical port 34 at a splitting end 36 thereof, and second and third optical ports 38, 40, respectively, at a combining end 42 of the walk off device 32, opposite the splitting end 36. A first Faraday rotator 44 is coupled in an optical path with the second optical port 38 and a second Faraday rotator 46 is coupled in an optical path with the third optical port 40. As shown, a spatial offset or displacement is provided between the first and second Faraday rotators 44, 46 to enable each of the devices to operate independently (e.g., possess different magnetic fields) without affecting the other. The optical device 30 includes fourth and fifth optical ports 48, 50 coupled to the first and second Faraday rotators 44, 46 at a side opposite that leading to the walk off device 32. In the embodiment shown in FIG. 1, the Faraday rotators are preferably the same approximate thickness and comprised of the same material, where the magnetic field through each of the rotators is in the opposite direction. It would be understood that the first and second Faraday rotators 44, 46 may also be comprised of different materials, however, by including Faraday rotators of the same thickness and same material, the number of different components is reduced thereby advantageously reducing manufacturing costs. Additionally, if the Faraday rotators are made of "latching garnet", for example, where no external magnetic field is needed to achieve the desired Faraday rotation, then oppositely directed magnetic fields need not be supplied.

It would be understood that the Faraday rotators (other than the latching garnet type) are used in conjunction with a magnetic field that is either approximately parallel to a beam direction or approximately anti-parallel to a beam direction. For a given Faraday material and optical wavelength, the amount of rotation of the plane of polarization for a given thickness of material can be readily determined. Reversing the direction of the beam propagation without a reversal of the direction of the magnetic field will cause the rotation direction of the plane of polarization relative to the beam direction to be in the opposite sense. By choosing a thickness of the material so that the amount of rotation is about 45 degrees, useful, non-reciprocal behavior can be obtained.

Having described the basic structure of the non-reciprocal optical device 30 of the present invention, the operation of the device can now be described. As an example, assume an unpolarized light beam enters the walk off device at port 34. The walk off device divides the beam into two parallel beams with mutually orthogonal polarization, that is, ordinary and extraordinary rays. As shown in FIG. 3, the walk-off device 32 is oriented such that a walk-off direction is indicated by the divergence in the optical paths, i.e., by the oblique paths in the devices. As discussed, the magnetic field through the first and second Faraday rotators 44, 46 are in opposite directions. Accordingly, the beams entering the Faraday rotators receive a ±45 degree rotation in opposite directions. Thus, the two beams exiting the non-reciprocal device at ports 48, 50 will be beams having parallel like polarizations.

Figure 4A:
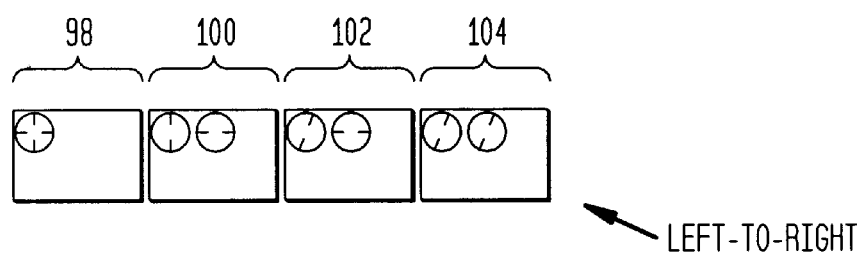
FIG. 4A shows an exemplary representation of the polarization states for beams traveling left to right in the embodiment shown in FIG. 3.
Figure 4B:
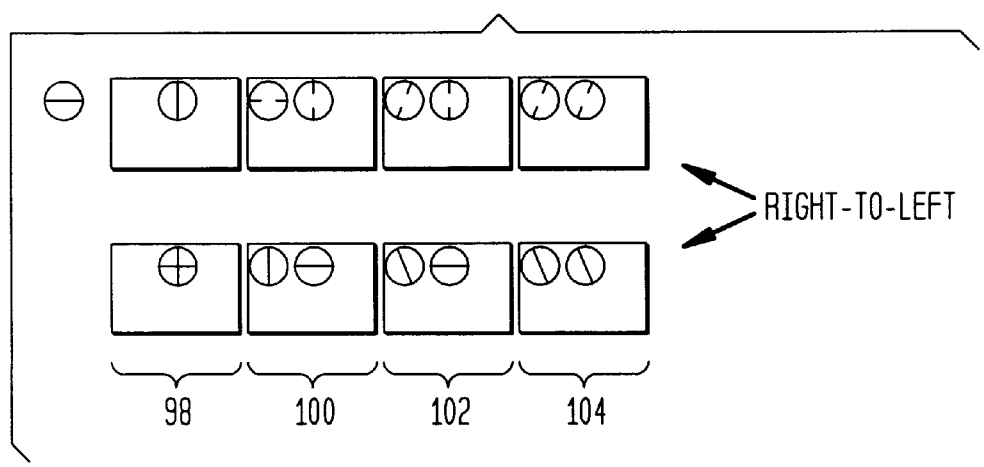
FIG. 4B shows exemplary representations of the polarization states for beams traveling right to left in the embodiment shown in FIG. 3.

FIGS. 4A and 4B viewed in conjunction with FIG. 3 show an exemplary representation of the polarization states of the beams as they travel through the present invention non-reciprocal device 30 at different stages. As discussed, an unpolarized light beam entering at the first optical port 34 at location 98 emerges from the walk off device 32 at location 100 as two parallel beams having mutual orthogonal polarization states. The combination of Faraday rotators 44, 46 acts to make beams having mutually orthogonal polarization states parallel while making parallel planes orthogonal. As shown in FIG. 3 the upper beam entering the first Faraday rotator 44 from the second optical port 38 of the walk off device 32 has its polarization plane rotated by 45 degrees in one direction, for example clockwise. The polarization states of the two beams at this location 102 are represented in FIG. 4A. The lower beam exiting the third optical port 40 of the walk off device 32 next enters the second Faraday rotator and experiences a 45 degree rotation of its polarization plane in the opposite direction, for example, counter-clockwise, due to the opposite direction of the magnetic field in the second Faraday rotator 46 versus the first Faraday rotator 44. The polarization planes of the two beams exiting the optical device 30 at location 104 are shown in FIG. 4A. As can be seen, the mutually orthogonal polarization planes have been made to be parallel. Thus, if there is no problem having a 45 degree angle between the plane of polarization and the offset between the two parallel beams, the 45 degree Faraday rotation of the two beams exiting the walk off device 32 can be used to produce parallel like polarization modes without the use of half wave plates.

It would also be understood that the optical device 30 of the present invention is non-reciprocal such that a beam or beams traveling through the device in one direction will behave differently when traveling in the opposite direction. For example, assuming the same polarization states of the beams that exited from the optical device when traveling left to right, when traveling right to left through the fourth and fifth optical ports 48, 50 these same polarization states of the two beams will initially be made to be mutually orthogonal by the Faraday rotators 44, 46 in location 100 as shown in FIG. 4B. When entering the second and third optical ports 38, 40 of the walk off device after exiting the Faraday rotators 44, 46, the top beam would be O-polarized with respect to the walk off device 32 and the lower beam would be E-polarized with respect to that walk off device. Thus, the top beam would continue along the ordinary path of the walk off device 32 and the lower beam would get walked off in the walk off direction of the walk off device. Accordingly, the two beams will not be combined in the walk off device 32 and will not exit from the first optical port 34. Thus, it can be seen that the device is non-reciprocal in that beams traveling in a first direction through the device will not necessarily experience the same effects when traveling in the opposite direction. A further example of non-reciprocality is that two parallel polarized beams entering at the fourth and fifth optical ports 48, 50 of the optical device 30 traveling right to left and having polarizations which are orthogonal to the case previously discussed will travel through the Faraday rotators 44, 46 and be combined in the walk-off device 32 such that a single beam will emerge from the first optical port 34 at location 98 as shown in the lower portion of FIG. 4B.

Figure 5:
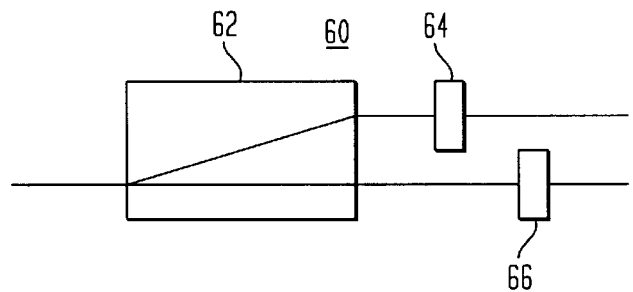
FIG. 5 shows a sectional view for one embodiment of a scheme for non-reciprocal termination of parallel like polarization modes in accordance with the present invention.

Referring to FIG. 5, an alternate embodiment of a non-reciprocal optical device 60 is shown in accordance with the present invention. As can be seen, the optical device 60 is similar to the device shown in FIG. 3, wherein the device includes a walk off device 62 and first and second Faraday rotators 64, 66. The main difference between the two devices is that in this case the first Faraday rotator 64 is located nearer to the walk off device 62 than the second Faraday rotator 66. Otherwise, the structure and operation of the two devices is substantially similar.

Figure 6:
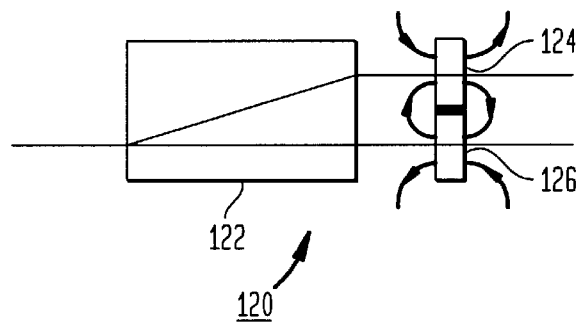
FIG. 6 shows a sectional view for one embodiment of a scheme for non-reciprocal termination of parallel like polarization modes in accordance with the present invention utilizing latched garnet Faraday rotators.

Referring to FIG. 6, an alternate embodiment of the present invention optical device 120 is shown. As shown, the optical device 120 includes a walk-off device 122 and first and second Faraday rotators 124, 126 made, for example, from latched garnet. In this case, an advantage is that the two Faraday rotators can be adjacent and support each others different polarization direction since no external magnetic field is needed to achieve the desired Faraday rotation. Operation of the device shown in FIG. 6 is similar to that of the devices depicted in FIGS. 3 and 5, as would be understood by those skilled in the art.

The device shown in FIGS. 3, 5 and 6 may be combined with other optical components to produce more sophisticated optical devices and assemblies. In such an assembly, one or more walk off devices may be used where the polarization planes are initially 45 degrees with respect to the parallel beam separation. If desired, Faraday rotators, optically active media, odd-half wave plates or other means can then be used to make the beams parallel or perpendicular to the separation of the beams.

Figure 7:
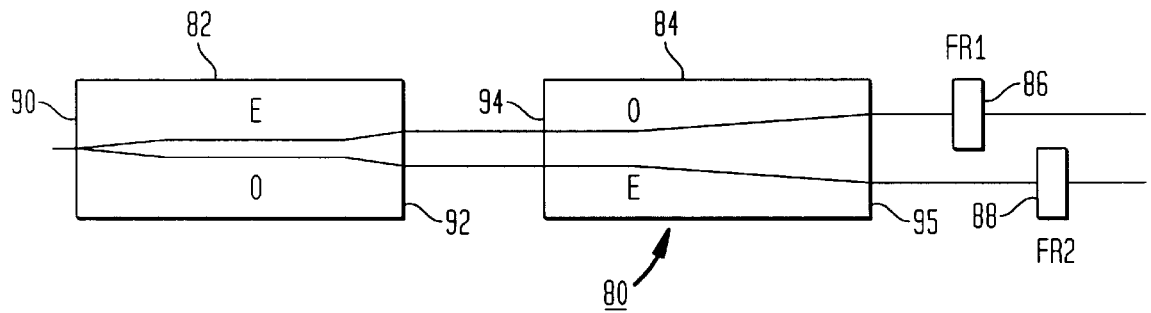
FIG. 7 shows a sectional view for one embodiment of an assembly of multiple walk-off devices for non-reciprocal termination of parallel like polarization modes in accordance with the present invention.

One such optical assembly 80 is shown in FIG. 7. The assembly 80 includes a first walk off device 82 and a second walk off device 84 followed by first and second 45 degree Faraday rotators 86, 88, respectively. From a general view point, first and second walk off devices 82, 84 together are seen as a walk-off device in that unpolarized light emerges as parallel beams of orthogonally polarized light. The first walk off device includes a single optical port at a first end 90 thereof and two optical ports at a second end 92 thereof. The second walk off device 84 includes two optical ports at a first end 94 thereof which correspond or align with the two optical ports of the first walk off device 82 and two optical ports located at a second end 95 thereof. The first and second Faraday rotators 86, 88 are coupled in optical paths, respectively, with the two optical ports of the second walk off device 84 nearest them. As described with respect to FIGS. 3 and 5, the magnetic fields, if needed, through the two Faraday rotators 86, 88 are preferably in opposite directions. As shown in FIG. 7, the walk off devices 82, 84 are rotated 90 degrees with respect to one another along the direction of the beams. In one of the walk off devices, e.g. the first walk off device 82, the beam separation is predominantly "horizontal" and in the other, e.g. the second walk off device 84, the beam separation is predominantly "vertical". Here, the total resulting separation is at 45 degrees to the vertical (or horizontal), yet the polarization directions of the walk off devices are vertical and horizontal. Thus, the beam separations are at 45 degrees to the polarizations of the walk off devices. As would be understood, the first and second Faraday rotators 86, 88 provide an additional 45 degree twist in the polarizations of the beams (traveling left to right) making the polarizations and the beam separations all at 45 degrees with respect to the vertical orientation. Accordingly, the assembly 80 provides parallel like polarized beams as in the case of an OPSOC or EPSOC, as shown in FIGS. 1 and 2. A difference, however, is that, as explained with respect to FIG. 3, the assembly 80 is non-reciprocal due to the use of the 45 degree Faraday rotators.

From the above, it should be understood that the embodiments described, in regard to the drawings, are merely exemplary and that a person skilled in the art may make variations and modifications to the shown embodiments without departing from the spirit and scope of the invention. For example, in the shown embodiments, if it is desired not to reverse the direction of the magnetic fields between the first and second Faraday rotators, then one would have to use Faraday rotators having a 45 degree and 3×45 degree rotation, i.e., different thicknesses, if it is desired to use the same material for both Faraday rotators. It would also be understood that the walk-off devices may be fabricated from a birefringent material such as calcite or rutile or also made from polarizing optical coatings; such materials and methods of fabrication are well known and the walk-off device will be readily fabricated by those skilled in the art as will the polarization interchanger. All such variations and modifications are intended to be included within the scope of the invention as defined in the appended claims.

What is claimed is:

1. An optical apparatus comprising
a first walk-off device having at least a first optical port at a first end thereof and at least a second and third optical port at a second end thereof,
a first Faraday rotator coupled in an optical path with said second optical port of said first walk off device; and
a second Faraday rotator coupled in an optical path with said third optical port of said first walk off device, each of said first and second Faraday rotator substantially providing a polarization rotation opposite to each other which is an odd multiple of 45 degrees, further including a second walk off device disposed between said first walk off device and said first and second Faraday rotator, said second walk off device including first and second optical ports at a first end thereof aligning with said second and third optical ports of said first walk off device and third and fourth optical ports at a second end thereof aligning with said first and second Faraday rotator respectively.

2. The apparatus of claim 1, wherein each said walk-off device comprises a birefringent material.

3. The apparatus of claim 1, wherein said first and second walk off device produces beam polarizations which are substantially at a 45 degree angle with respect to parallel beam separation at said second end of said second walk off device.

4. The apparatus of claim 1, wherein walk off directions of said first and second walk off device are rotated 90 degrees with respect to one another.

* * * * *